(12) United States Patent
Matsuo et al.

(10) Patent No.: US 12,277,663 B2
(45) Date of Patent: Apr. 15, 2025

(54) MEASUREMENT PROCESSING DEVICE, METHOD, AND PROGRAM

(71) Applicants: MATSUO CONSTRUCTION CO., LTD, Saga (JP); OPTIM CORPORATION, Saga (JP)

(72) Inventors: Tetsugo Matsuo, Saga (JP); Nobuya Nishimoto, Saga (JP); Hiroki Takada, Saga (JP); Shunji Sugaya, Saga (JP); Syunsuke Naganuma, Saga (JP); Keisuke Murata, Saga (JP); Yasuaki Sakata, Saga (JP); Yoshio Okumura, Saga (JP); Kenta Kubo, Saga (JP)

(73) Assignee: OPTIM CORPORATION, Saga (JP)

( * ) Notice: Subject to any disclaimer, the term of this patent is extended or adjusted under 35 U.S.C. 154(b) by 264 days.

(21) Appl. No.: 18/007,353

(22) PCT Filed: Jul. 30, 2021

(86) PCT No.: PCT/JP2021/028451
§ 371 (c)(1),
(2) Date: Jan. 30, 2023

(87) PCT Pub. No.: WO2022/025283
PCT Pub. Date: Feb. 3, 2022

(65) Prior Publication Data
US 2023/0281942 A1 Sep. 7, 2023

(30) Foreign Application Priority Data
Jul. 31, 2020 (JP) .................................. 2020-130913

(51) Int. Cl.
*G06T 19/20* (2011.01)
*G06T 19/00* (2011.01)

(52) U.S. Cl.
CPC ............ *G06T 19/20* (2013.01); *G06T 19/006* (2013.01); *G06T 2219/2016* (2013.01)

(58) Field of Classification Search
None
See application file for complete search history.

(56) References Cited

U.S. PATENT DOCUMENTS

| 11,636,658 B1 * | 4/2023 | Tsai | G06V 10/82 |
| | | | 345/633 |
| 11,656,835 B1 * | 5/2023 | Rice | G06F 3/1454 |
| | | | 345/419 |

(Continued)

FOREIGN PATENT DOCUMENTS

| JP | 2008-40913 A | 2/2008 |
| JP | 2009-204615 A | 9/2009 |

(Continued)

OTHER PUBLICATIONS

International Search Report from PCT/JP2021/028451 Oct. 12, 2021, 5 pgs.

*Primary Examiner* — Nurun Flora
(74) *Attorney, Agent, or Firm* — Tutunjian & Bitetto, P.C.

(57) ABSTRACT

To accurately replace the position coordinate in a virtual space composed of three-dimensional data with latitude, longitude, and altitude information in a real space. The device for measurement processing images a real space by the camera unit; superimposes virtual space indicating the imaged real space by three-dimensional data on the imaged real space and displays the superimposed spaces; acquires a measurement point from a position-measuring device measuring a latitude, a longitude, and an altitude; images the position-measuring device, associates the position coordinate in the virtual space of the imaged position-measuring device with the position coordinate of the acquired measurement point in the real space; and transforms the coor- (Continued)

dinate of the three-dimensional data to the position coordinate in the real space by a predetermined transformation equation.

5 Claims, 4 Drawing Sheets

(56) References Cited

U.S. PATENT DOCUMENTS

| | | | |
|---|---|---|---|
| 12,120,168 B1* | 10/2024 | Cristea | H04L 65/80 |
| 2019/0096129 A1* | 3/2019 | Rhodes | G06F 3/011 |
| 2020/0294293 A1* | 9/2020 | Boenig, II | G06T 11/60 |
| 2022/0254481 A1* | 8/2022 | Avisar | G16H 40/20 |
| 2023/0334725 A1* | 10/2023 | Marsden | H04W 4/024 |

FOREIGN PATENT DOCUMENTS

| | | |
|---|---|---|
| JP | 2012-63866 A | 3/2012 |
| JP | 2012-88114 A | 5/2012 |
| JP | 2013-89123 A | 5/2013 |
| JP | 2017-142204 A | 8/2017 |
| JP | 2018-534698 A | 11/2018 |
| JP | 2020-12750 A | 1/2020 |
| JP | 2020-196977 A | 12/2020 |

\* cited by examiner

| Position coordinate in virtual space of imaged position-measuring device | | | Position coordinate of acquired measurement point in real space | | |
|---|---|---|---|---|---|
| X axis | Y axis | Z axis | latitude | longitude | altitude |
|  |  |  |  |  |  |

MEASUREMENT PROCESSING DEVICE, METHOD, AND PROGRAM

CROSS-REFERENCE TO RELATED APPLICATIONS

This U.S. National Stage application claims the benefit and priority under 35 U.S.C. § 371 of PCT/JP2021/028451 filed on Jul. 30, 2021, which claims the benefit and priority of Japanese Patent application No. 2020-130913 filed Jul. 31, 2020, the disclosure of which is incorporated herein by reference in its entirety.

TECHNICAL FIELD

The present invention provides a device, a method, and a program for measurement processing that accurately replaces the position coordinates in a virtual space composed of three-dimensional data with latitude, longitude, and altitude information in a real space.

BACKGROUND ART

As a conventional surveying technique in recent years, the photogrammetry technique using a photograph with known singular points (Patent Document 1) and the laser surveying technique surveying the place of a laser survey instrument emitting laser as a known place (Patent Document 2) have been known.

DOCUMENT IN THE EXISTING ART

Patent Document

Patent Document 1: JP 2020-196977 A
Patent Document 2: JP 2020-12750 A

SUMMARY

However, both of the above-mentioned conventional techniques requiring special surveying techniques are unable to accurately replace the position coordinates in a virtual space composed of three-dimensional data with latitude, longitude, and altitude information in a real space by easy operation.

An objective of the present invention is to provide a device, a method, and a program for measurement processing that accurately replaces the position coordinates in a virtual space composed of three-dimensional data with latitude, longitude, and altitude information in a real space to easily generate the three-dimensional data of an object to be surveyed without requiring a special surveying technique.

The present invention provides a device for measurement processing, includes a camera unit that images a real space. An augmented reality display unit superimposes virtual space over the imaged real space by three-dimensional data on the imaged real space and displays the superimposed spaces. A position coordinate acquisition unit acquires a measurement point from a position-measuring device measuring a latitude, a longitude, and an altitude, and a coordinate transformation unit images the position-measuring device, associates the position coordinates in the virtual space of the imaged position-measuring device with the position coordinates of the acquired measurement point in the real space, and transforms the coordinates of the three-dimensional data to the position coordinates in the real space by a predetermined transformation equation.

The present invention provides a method for measurement processing, including imaging a real space, superimposing a virtual space over the imaged real space by three-dimensional data on the imaged real space and displaying the superimposed spaces. A measurement point is acquired from a position-measuring device measuring a latitude, a longitude, and an altitude. The position-measuring device is imaged, associating the position coordinates in the virtual space of the imaged position-measuring device with the position coordinates of the acquired measurement point in the real space. The coordinates of the three-dimensional data are transformed to the position coordinates in the real space by a predetermined transformation equation.

The present invention provides a computer-readable program for measurement processing, causing an computer to image a real space and superimpose a virtual space over the imaged real space by three-dimensional data on the imaged real space and displaying the superimposed spaces. A measurement point is acquired from a position-measuring device measuring a latitude, a longitude, and an altitude. The position-measuring device is imaged, associating the position coordinates in the virtual space of the imaged position-measuring device with the position coordinates of the acquired measurement point in the real space. The coordinates of the three-dimensional data are transformed to the position coordinates in the real space by a predetermined transformation equation.

The present invention images a real space, superimposes a virtual space over the imaged real space by three-dimensional data on the imaged real space and displays the superimposed spaces. A measurement point is acquired from a position-measuring device measuring a latitude, a longitude, and an altitude. The position-measuring device is imaged, associating the position coordinates in the virtual space of the imaged position-measuring device with the position coordinates of the acquired measurement point in the real space. The coordinates of the three-dimensional data are transformed to the position coordinates in the real space by a predetermined transformation equation.

Accordingly, the present invention can accurately replace the position coordinates in a virtual space composed of three-dimensional data with latitude, longitude, and altitude information in a real space by easy operation to generate the three-dimensional data of an object to be surveyed without requiring a special surveying technique

DETAILED DESCRIPTION OF THE EMBODIMENTS

The present invention images a real space, and superimposes a virtual space over the imaged real space by three-dimensional data on the imaged real space and displays the superimposed spaces. A measurement point is acquired from a position-measuring device measuring a latitude, a longitude, and an altitude. The position-measuring device is imaged, associating the position coordinates in the virtual space of the imaged position-measuring device with the position coordinates of the acquired measurement point in the real space. The coordinate of the three-dimensional data are transformed to the position coordinates in the real space by a predetermined transformation equation.

Accordingly, the present invention is a system, a method, and a program that can accurately replace the position coordinates in a virtual space composed of three-dimensional data with latitude, longitude, and altitude information in a real space by easy operation to generate the three-dimensional data of an object to be surveyed without requiring a special surveying technique. Embodiments of the present invention are described below with reference to examples.

Entire Configuration

Figure 1:
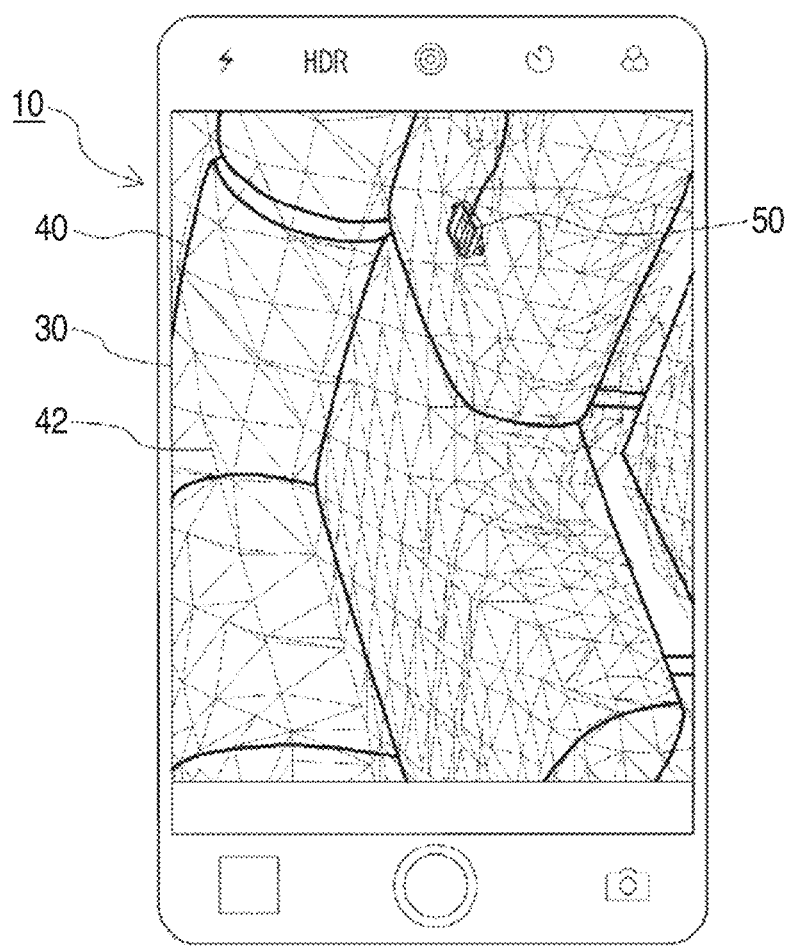
FIG. 1 shows an example image screen of the device for measurement processing according to one embodiment of the present invention.

FIG. 1 shows an example image screen of the device for measurement processing according to this embodiment. The image may be a still or moving image. In the example shown in FIG. 1, the device for measurement processing 10 is a smart phone. However, the device for measurement processing 10 may be another terminal such as a tablet or a PC. The display unit 30 of the device for measurement processing 10 superimposes the virtual space 42 over the imaged real space 40 on the actually imaged real space 40 by three-dimensional data and displays the superimposed spaces. The position-measuring device 50 is imaged by the device for measurement processing 10.

In this embodiment, the sofa of real space 40 is imaged. The three-dimensional data is explained as three-dimensional point cloud data but may be three-dimensional mesh data, three-dimensional TIN (Triangulated Irregular Network) data, or equivalent data. The three-dimensional point cloud data is composed of many triangles. The sides of each of the triangles are composed of many three-dimensional point clouds. The three-dimensional point clouds each have X, Y, and Z coordinates. For the point cloud processing, LIDAR (Laser Imaging Detection and Ranging) is used, for example. LIDR is one of the remote sensing technologies using light, which measures the scattering light at pulsed lasers and analyzes the distance to an object at long range and the character of the object.

In this embodiment, the position-measuring device 50 uses a GNSS device. The GNSS (Global Navigation Satellite System) device is a global positioning system device using artificial satellites (positioning satellites). The positioning technique by the GNSS device is known, which calculates the distances from the GNSS device to four positioning satellites and mathematically determines the intersection of the distances as the position of the GNSS device. Since the specific calculation method is known, the explanation is left out.

In this embodiment, the display unit 30 displays only one position-measuring device 50. However, more than one (at least four) measurement points may be used for transformation using Helmert transformation or Procrustes analysis. Helmert transformation is one of coordinate transformations. Procrustes analysis translates, rotates and uniformly scales two corresponding points to superimpose one of the points on the other so that the square error between the two points is minimized. Since these technologies are known, the detailed explanation is left out.

The device for measurement processing 10 images the position-measuring device 50, associates the position coordinates in the virtual space of the imaged position-measuring device 50 with the position coordinates of the acquired measurement point in the real space, and transforms the coordinates of the three-dimensional point cloud data to the position coordinate in the real space by a predetermined transformation equation. Accordingly, the present invention can accurately replace the position coordinates in a virtual space composed of three-dimensional data with latitude, longitude, and altitude information in a real space by easy operation to generate the three-dimensional data of an object to be surveyed without requiring a special surveying technique.

Configuration of Device for Measurement Processing

Figure 2:
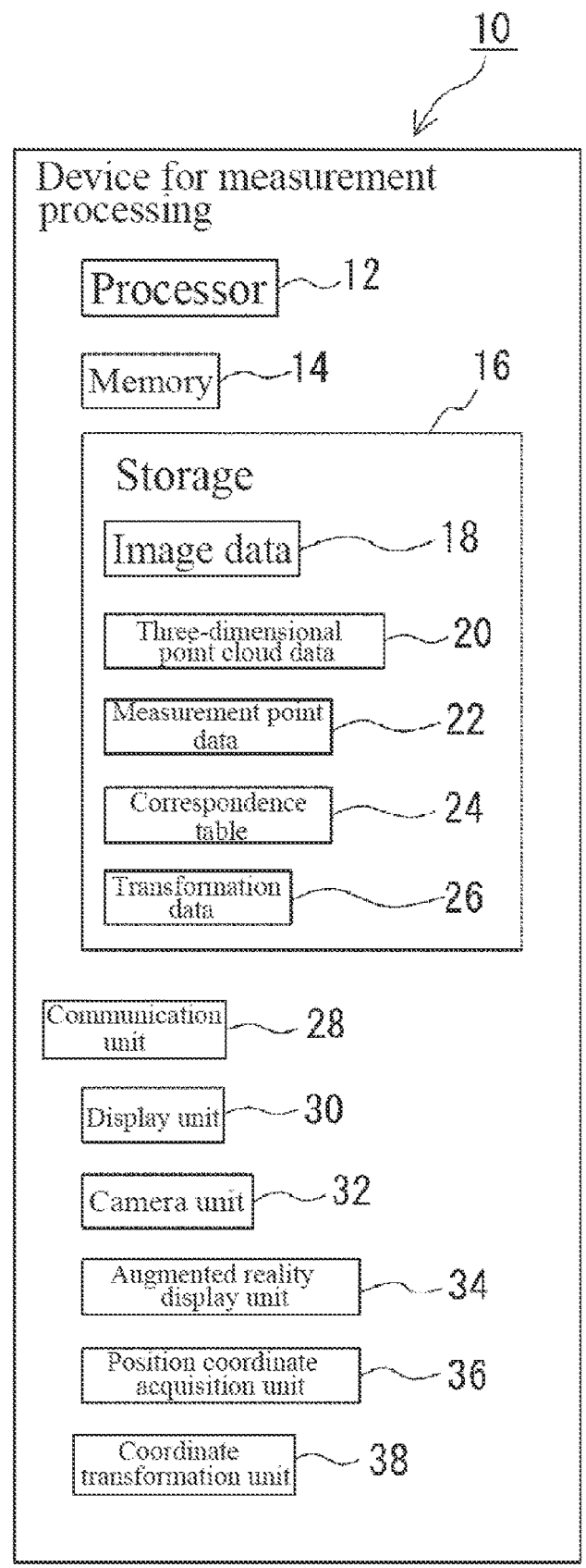
FIG. 2 is a block diagram illustrating the hardware configuration and the functional configuration of the device for measurement processing according to the embodiment.

The configuration of the device for measurement processing 10 is described below with reference to FIGS. 2 and 3. FIG. 2 is a block diagram illustrating the hardware configuration and the functional configuration of the device for measurement processing 10 according to this embodiment. The device for measurement processing 10 is provided with a processor 12, a memory 14, a storage 16, a communication unit 28, a display unit 30, and a camera unit 32 as hardware. These are connected through buses not shown in the drawings. The device for measurement processing 10 may not a single computer and may be a system in which a computer that is communicative with the device for measurement processing 10 is connected with a network.

The processor 12 is composed of CPU (Central Processing Unit), which performs various processes by reading and executing various programs stored the memory 14.

The memory 14 stores programs executed by the processor 12, which is composed of ROM (Read Only Memory) and RAM (Random Access Memory), for example. The memory 14 stores the augmented reality display unit 34, the position coordinate acquisition unit 36, and the coordinate transformation unit 38 that are described later, for example.

The storage 16 stores the acquired image data 18, three-dimensional point cloud data 20, measurement point data 22, a correspondence table 24, transformation data 26, and control programs not shown in the drawings, for example.

The image data 18 is data imaged by the camera unit 32. The three-dimensional point cloud data 20 is generated from the image data. The measurement point data 22 is acquired by a position-measuring device 50. The correspondence table 24 associates the position coordinates in the virtual space of the imaged position-measuring device 50 with the position coordinates of the acquired measurement point in the real space.

Figures 3, 4:
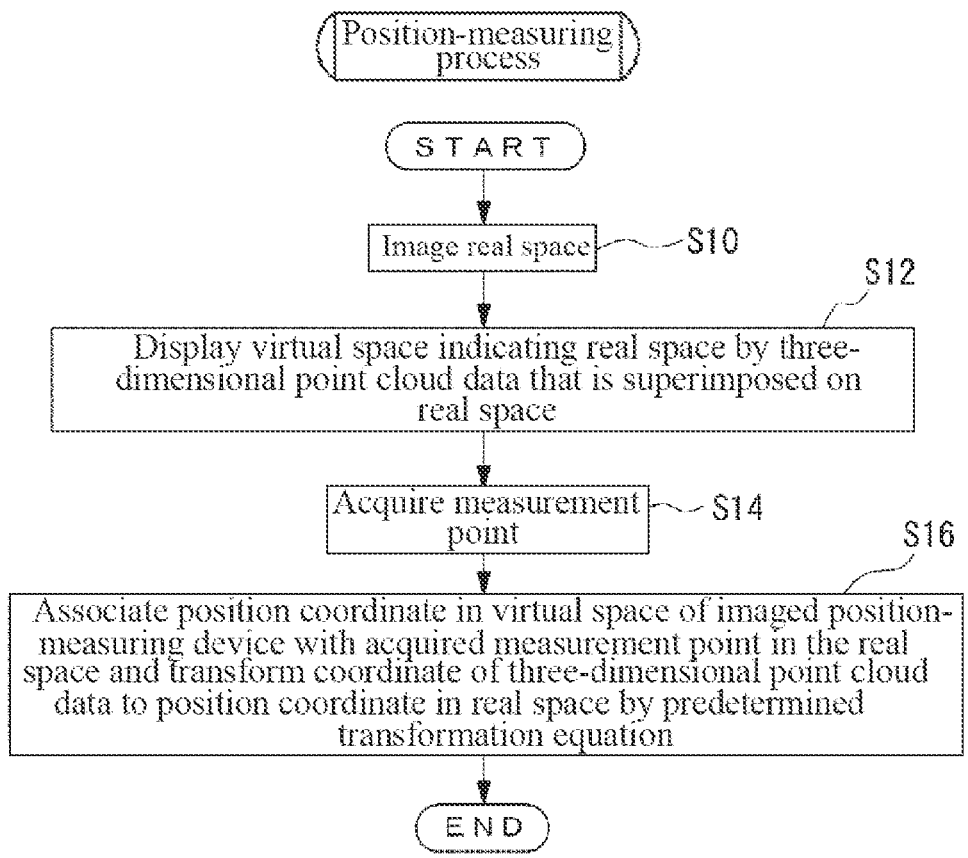
FIG. 3 shows an example correspondence table according to the embodiment.
FIG. 4 is a flow chart illustrating an example measurement process according to the embodiment.

FIG. 3 shows an example correspondence table. As shown in FIG. 3, in the correspondence table 24, the position coordinates (X, Y, and Z axes) in the virtual space 42 of the imaged position-measuring device 50 is associated with the position coordinates (latitude, longitude, and altitude) of the acquired measurement point in the real space.

In the transformation data 26, the coordinate of the three-dimensional point cloud data is transformed to the position coordinates in a real space by a predetermined transformation equation based on the correspondence table 24.

The communication unit 28 performs various data communication with the position-measuring device 50 and other external units and servers through a network not shown in the drawing.

The display unit 30 is a touch panel, for example. The camera unit 32 is installed in the device for measurement processing 10, for example.

The functional configuration of the device for measurement processing 10 is described below. The device for measurement processing 10 is provided with an augmented reality display unit 34, a position coordinate acquisition unit 36, and a coordinate transformation unit 38. These units may be achieved with multiple computers communicatively connected with the device for measurement processing 10 through a network. In other words, the units may be achieved with a single or multiple server computers communicatively connected with the device for measurement processing 10.

The augmented reality display unit 34 superimposes the virtual space 42 indicating the imaged real space 40 by three-dimensional point cloud data on the imaged real space 40 and displays the superimposed spaces. For example, the display unit 30 superimposes the virtual space 42 (mesh data composed of three-dimensional point cloud data) on the real space 40 and displays the superimposed spaces as shown in FIG. 1. The point cloud processing performs LIDAR processing, for example.

The position coordinate acquisition unit 36 acquires a measurement point from a position-measuring device 50 measuring a latitude, a longitude, and an altitude. The position coordinates in the real space that the position coordinate acquisition unit 36 acquires is the measurement value of the GNSS device. The number of the measurement point is not limited to one. For example, more than one (at least four) points may be acquired to perform transformation using Helmert transformation or Procrustes analysis. The device for measurement processing 10 acquires a measurement point from a position-measuring device 50 through the communication unit 28.

The coordinate transformation unit 38 images the position-measuring device 50, associates the position coordinates in the virtual space 42 of the imaged position-measuring in device with the position coordinates of the acquired measurement point in the real space 40, and transforms the coordinates of the three-dimensional point cloud data to the position coordinate in the real space by a predetermined transformation equation.

Position-Measuring Process

One example of the position-measuring process performed by the device for measurement processing 10 according to this embodiment is described below with reference to FIG. 4. FIG. 4 is a flow chart illustrating an example position-measuring process according to the embodiment.

The camera unit 32 images the real space 40 (Step S10). The image data is stored in the storage 16 as image data 18. The augmented reality display unit 34 superimposes the virtual space 42 indicating the imaged real space 40 by three-dimensional point cloud data on the imaged real space 40 and displays the superimposed spaces (Step S12). The three-dimensional point cloud data is stored in the storage 16. For example, the display unit 30 of the device for measurement processing 10 displays the mesh data composed of three-dimensional point cloud data indicating the virtual space 42 that is superimposed on a sofa as the real space 40 as shown in FIG. 1.

The position coordinate acquisition unit 36 acquires a measurement point (Step S14). The position coordinate acquisition unit 36 acquires a measurement point from a position-measuring device 50 measuring a latitude, a longitude, and an altitude through the communication unit 28. The acquired measurement point is stored in the storage 16 as measurement point data 22.

The coordinate transformation unit 38 images the position-measuring device 50 and associates the position coordinates in the virtual space 42 of the imaged position-measuring device with the acquired measurement point in the real space 40. Such associated data is stored in the storage 16 as the correspondence table 24. The coordinate transformation unit 38 transforms the coordinates of the three-dimensional point cloud data to the position coordinates in the real space by a predetermined transformation equation (Step S16). The transformation data 26 is stored in the storage 16.

In this embodiment, a verification point may be plotted to confirm an error. If an error can be confirmed in range, the device for measurement processing 10 can be used even in a construction site and for the data of ICT (Information and Communication Technology) construct machinery.

Furthermore, in this embodiment, the position-measuring device 50 may be automatically detected by image recognition, etc.

Figure 5:
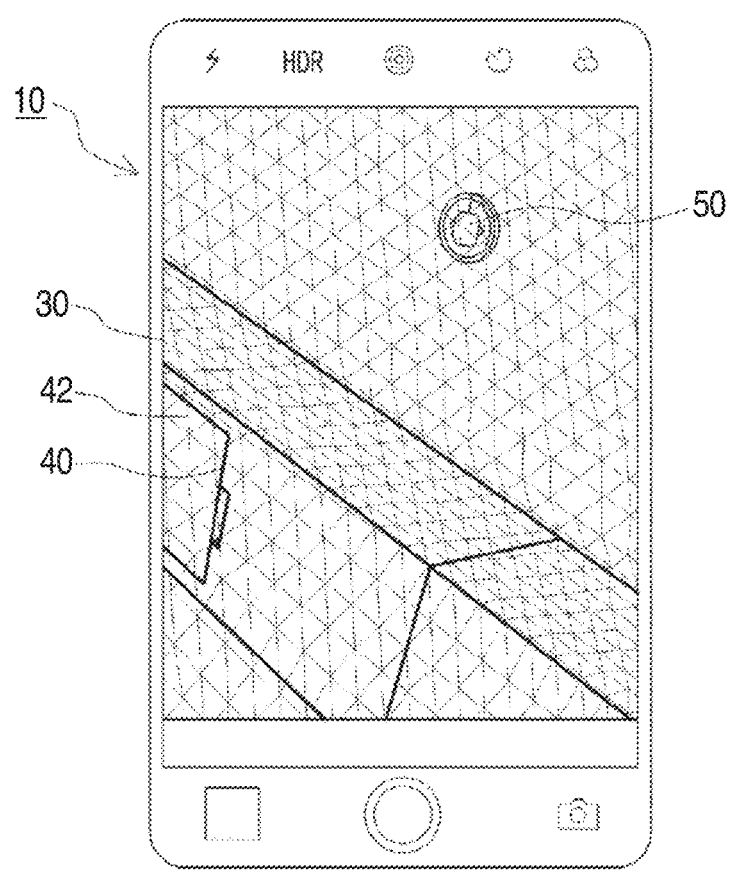
FIG. 5 shows another example image screen of the device for measurement processing according to the embodiment.

Furthermore, in this embodiment, the position-measuring device 50 may be imaged so that the position-measuring device 50 is contained in the moving image. For example, as shown in FIG. 5, when the moving image of a house construction site (real space 40) is taken, the virtual space 42 indicated by three-dimensional point cloud data may be superimposed on the real space 40, and the coordinates of the three-dimensional point cloud data is transformed to the position coordinates in a real space by processing in the same way for the still image.

Effects

According to this embodiment, the camera unit 32 images a real space 40, and the augmented reality display unit 34 superimposes the virtual space 42 over the imaged real space 40 by three-dimensional point cloud data on the imaged real space 40 and displays the superimposed spaces. The position coordinate acquisition unit 36 acquires a measurement point from the position-measuring device 50 measuring a latitude, a longitude, and an altitude, and the coordinate transformation unit 38 images the position-measuring device 50, associates the position coordinates in the virtual space 42 of the imaged position-measuring device 50 with the position coordinates of the acquired measurement point in the real space 40, and transforms the coordinates of the three-dimensional point cloud data to the position coordinate in the real space by a predetermined transformation equation.

Accordingly, the present invention can accurately replace the position coordinates in a virtual space composed of three-dimensional data with latitude, longitude, and altitude information in a real space by easy operation to generate the three-dimensional data of an object to be surveyed without requiring a special surveying technique.

The above-mentioned embodiment is just one example and can be appropriately modified in the range that produces a similar effect.

(1) The real space 40 and the virtual space 42 described in the above-mentioned embodiment are just one example. The present invention is applicable for any places such a building, a mountain, and river.

(2) The number of measurement points described in the above-mentioned embodiment is just one example. The number may be appropriately increased or decreased if necessary.

(3) The transformation using Helmert transformation or Procrustes analysis described in the above-mentioned embodiment is just one example. Any known transformation methods may be applicable as long as similar effect is produced.

(4) The position-measuring device 50 described in the above-mentioned embodiment are just one example. A small position-measuring device is used in the example shown in the drawings. When a position-measuring device 50 is imaged outside, a GNSS measurement device with a measurement point at its top that is piled to a post as a reference point may be used. Any suitable GNSS devices may be used depending on measuring objects.

(5) In the above-mentioned embodiment, the three-dimensional point cloud processing is performed by LIDAR. However, other known techniques shall not be excluded for the point cloud processing.

(6) In the above-mentioned embodiment, the device for measurement processing 10 such as a smart phone performs all the processes, which is just one example. An external device or server may perform some of the functions.

(7) The present invention may be provided as a program executed by the device for measurement processing 10. The program may be provided from a computer-readable recording medium or downloaded through a network. The present invention may be provided as a process.

INDUSTRIAL APPLICABILITY

The present invention images a real space and superimposes a virtual space over the imaged real space by three-dimensional point cloud data on the imaged real space and displays the superimposed spaces. A measurement point is acquired from a position-measuring device measuring a latitude, a longitude, and an altitude. The position-measuring device is imaged and associates the position coordinates in the virtual space of the imaged position-measuring device with the position coordinates of the acquired measurement point in the real space. The coordinates of the three-dimensional point cloud data are transformed to the position coordinate in the real space by a predetermined transformation equation.

Accordingly, the present invention can accurately replace the position coordinates in a virtual space composed of three-dimensional data with latitude, longitude, and altitude information in a real space to easily generate the three-dimensional data of an object to be surveyed without requiring a special surveying technique, which is suitable for the use of a device for measurement processing.

DESCRIPTION OF REFERENCE NUMERALS

10: Device for measurement processing, 12: Processor, 14: Memory, 16: Storage, 18: Image data, 20: Three-dimensional point cloud data, 22: Measurement point data, 24: Correspondence table, 26: Transformation data, 28: Communication unit, 30: Display unit, 32: Camera unit, 34: Augmented reality display unit, 36: Position coordinate acquisition unit, 38: Coordinate transformation unit, 40: Real space, 42: Virtual space, 50: Position-measuring device.

What is claimed is:

1. A device for measurement processing, comprising:
a camera unit imaging a real space;
an augmented reality display unit superimposing a virtual space over the imaged real space by three-dimensional data on the imaged real space and displays the superimposed virtual spaces;
a position coordinate acquisition unit acquires a measurement point from a position-measuring device measuring a latitude, a longitude, and an altitude; and
a coordinate transformation unit images the position-measuring device, associates position coordinates in the virtual space of the imaged position-measuring device with position coordinates of the acquired measurement point in the real space, and transforms coordinates of the three-dimensional data to the position coordinates in the real space by a predetermined transformation equation.

2. The device for measurement processing according to claim 1, wherein a number of measurement points is more than one, and the transformation unit uses one of Helmert transformation and Procrustes analysis as the predetermined transformation equation.

3. The device for measurement processing according to claim 1, wherein the position coordinates in the real space that are acquired by the position coordinate acquisition unit is a measurement value from a global navigation satellite system.

4. A method for measurement processing, comprising:
imaging a real space;
superimposing a virtual space over the imaged real space by three-dimensional data on the imaged real space and displaying the superimposed spaces;
acquiring a measurement point from a position-measuring device measuring a latitude, a longitude, and an altitude; and
imaging the position-measuring device, associating position coordinates in the virtual space of the imaged position-measuring device with position coordinates of the acquired measurement point in the real space, and transforming coordinates of the three-dimensional data to the position coordinates in the real space by a predetermined transformation equation.

5. A non-transitory computer readable medium having a program for measurement processing stored thereon which, when executed, causes a computer to execute the steps of:
imaging a real space;
superimposing virtual space over the imaged real space by three-dimensional data on the imaged real space and displaying the superimposed spaces;
acquiring a measurement point from a position-measuring device measuring a latitude, a longitude, and an altitude; and
imaging the position-measuring device, associating position coordinates in the virtual space of the imaged position-measuring device with position coordinates of the acquired measurement point in the real space, and transforming coordinates of the three-dimensional data to the position coordinates in the real space by a predetermined transformation equation.

* * * * *